(12) United States Patent
Kim

(10) Patent No.: US 8,481,201 B2
(45) Date of Patent: Jul. 9, 2013

(54) CASE FOR SECONDARY BATTERY AND LITHIUM SECONDARY BATTERY USING THE SAME

(75) Inventor: Ho-Seong Kim, Yongin-si (KR)

(73) Assignee: Samsung SDI Co., Ltd., Yongin-si, Gyeonggi-do (KR)

( * ) Notice: Subject to any disclaimer, the term of this patent is extended or adjusted under 35 U.S.C. 154(b) by 396 days.

(21) Appl. No.: 12/881,597

(22) Filed: Sep. 14, 2010

(65) Prior Publication Data
US 2011/0123854 A1   May 26, 2011

(30) Foreign Application Priority Data
Nov. 26, 2009   (KR) .................. 10-2009-0115148

(51) Int. Cl.
*H01M 2/04* (2006.01)

(52) U.S. Cl.
USPC ......................................... 429/176; 429/185

(58) Field of Classification Search
USPC ................................. 429/176, 185
See application file for complete search history.

(56) References Cited

U.S. PATENT DOCUMENTS

| | | | | |
|---|---|---|---|---|
| 5,591,541 | A | * | 1/1997 | Oltman .................... 429/171 |
| 6,159,631 | A | * | 12/2000 | Thompson et al. ........ 429/82 |
| 2005/0031952 | A1 | * | 2/2005 | Hayashi et al. ........... 429/185 |
| 2007/0145098 | A1 | | 6/2007 | Lee et al. |

FOREIGN PATENT DOCUMENTS

| | | |
|---|---|---|
| JP | 60-200456 | 10/1985 |
| KR | 10 2006 0027270 | 9/2004 |
| KR | 10 2006 0059705 | 11/2004 |
| KR | 1020060111844 | 10/2006 |

OTHER PUBLICATIONS

Office Action dated Apr. 22, 2011 for corresponding Korean Application No. 10-2009-0115148.
Office Action dated Nov. 28, 2011 for corresponding KR Application No. 10-2009-0115148.

* cited by examiner

*Primary Examiner* — Mark F Huff
*Assistant Examiner* — Monique Wills
(74) *Attorney, Agent, or Firm* — Knobbe, Martens, Olson & Bear, LLP

(57) ABSTRACT

A case for secondary battery and a lithium secondary battery including the case, the case including: opposing main walls; opposing side walls connected to the main walls; and a bottom wall connected ends of the main and side walls. The bottom wall has a first notch extending between the main walls. The thickness of the bottom wall decreases from the side walls to a central portion thereof.

20 Claims, 8 Drawing Sheets

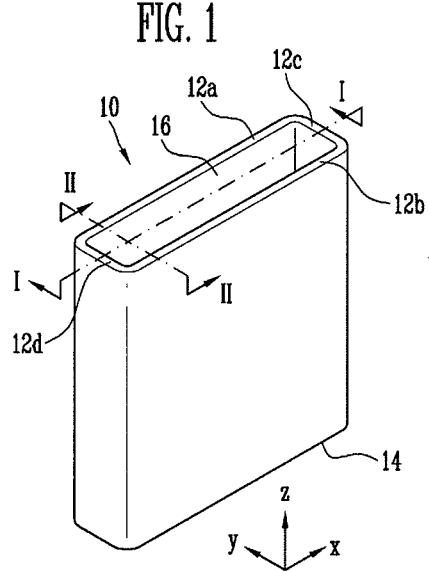
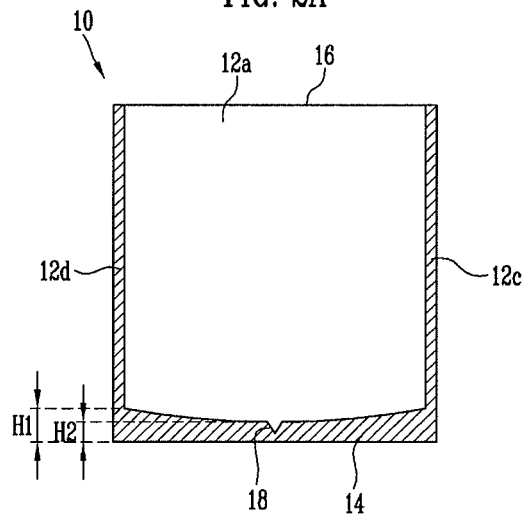

CASE FOR SECONDARY BATTERY AND LITHIUM SECONDARY BATTERY USING THE SAME

CROSS-REFERENCE TO RELATED APPLICATION

This application claims the benefit of Korean Patent Application No. 10-2009-0115148, filed on Nov. 26, 2009, in the Korean Intellectual Property Office, the disclosure of which is incorporated herein, by reference.

BACKGROUND

1. Field

Aspects of the present disclosure relate to a case for secondary battery and a lithium secondary battery using the same.

2. Description of the Related Art

A secondary battery can be repeatedly charged and discharged. A secondary battery is a kind of chemical battery that stores electric energy between electrodes, through a chemical reaction. Currently, secondary batteries include lead batteries, nickel-cadmium batteries, nickel-hydrogen batteries, lithium ion batteries, lithium ion polymer batteries, and the like. Secondary batteries are divided into a cylinder-type, prismatic-type, and the like, in accordance with their appearances.

Lithium ion batteries have a high energy density per unit volume. Therefore, various studies on lithium ion batteries have been conducted, to apply them to digital conversions, hybrid automobiles, robot industries, and the like.

SUMMARY

In one exemplary embodiment, there is provided a case for a secondary battery, in which a bottom wall of the case is pushed to the outside of the case under a longitudinal compression environment, so that it is possible to improve stability under longitudinal compression.

In another exemplary embodiment, there is provided a lithium secondary battery, in which a case having an improved stability for longitudinal compression is used, so that it is possible to inhibit an electrode assembly from being pierced by a bottom wall of the case, under a longitudinal compression environment.

According to an aspect of the present disclosure, there is provided a case for secondary battery, which includes first and second main walls opposite to each other; first and second side walls connected to the two main walls; and a bottom wall connected to ends of the main walls and the side walls. The bottom wall has a first notch extending between the main walls. The thickness of the bottom wall may decrease from the side walls to a central portion thereof. The thickness of the bottom wall may be decreased gradually.

According to another aspect of the present disclosure, there is provided a lithium secondary battery including the aforementioned case, and an electrode assembly disposed in the case, an electrolyte, and a cap assembly for sealing the case. The electrode assembly includes positive and negative electrode layers isolated from each by a separator.

In one exemplary embodiment, the first notch is formed on the outer surface of the bottom wall.

In one exemplary embodiment, the bottom wall includes a plurality of the first notches, evenly spaced apart between the first and second side walls.

In one exemplary embodiment, the bottom wall includes a plurality of the first notches disposed in pairs, between the side walls.

In one exemplary embodiment, the bottom wall includes three of the first notches.

According to some aspects, the bottom wall may further include second notches positioned at boundaries between the bottom wall and the main walls. The second notches may be respectively connected to ends of the first notches.

In one exemplary embodiment, the depth of the first and second notches is about 30 to 50% of the thickness of the bottom wall.

In one exemplary embodiment, the case may have rounded external corners at the interfaces of the main walls and the side walls.

According to some aspects, the case is formed of aluminum or an aluminum alloy.

According to exemplary embodiments of the present disclosure, there is provided secondary batteries including the above recited cases.

Additional aspects and/or advantages of the present disclosure will be set forth in part in the description which follows and, in part, will be obvious from the description, or may be learned by practice of the present disclosure.

BRIEF DESCRIPTION OF THE DRAWINGS

These and/or other aspects and advantages of the present disclosure will become apparent and more readily appreciated from the following description of the exemplary embodiments, taken in conjunction with the accompanying drawings, of which:

FIG. 1 is a perspective view of a case for secondary battery according to an embodiment of the present disclosure.

FIG. 2A is a longitudinal sectional view of the case for secondary battery, taken along line I-I in FIG. 1.

DETAILED DESCRIPTION

Figure 2B:
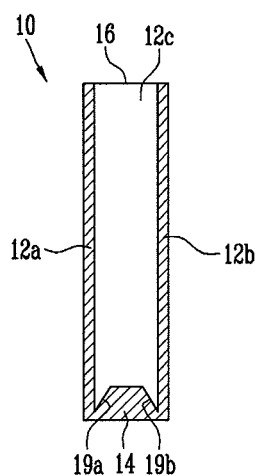
FIG. 2B is a longitudinal sectional view of the case for secondary battery, taken along line I-I in FIG. 1.

In the following detailed description, only certain exemplary embodiments of the present disclosure have been shown and described, simply by way of illustration. As those skilled in the art would realize, the described embodiments may be modified in various different ways, all without departing from the spirit or scope of the present disclosure. Accordingly, the drawings and description are to be regarded as illustrative in nature and not restrictive. In addition, when an element is referred to as being "on" another element, it can be disposed directly on another element or may be indirectly disposed on the other element, with one or more intervening elements interposed therebetween. Also, when an element is referred to as being "connected to" another element, it can be directly connected to another element or be indirectly connected to another element, with one or more intervening elements interposed therebetween. Hereinafter, like reference numerals refer to like elements. In the drawings, the thickness or size of layers are exaggerated for clarity and not necessarily drawn to scale.

FIG. 1 is a perspective view of a case 10 for a secondary battery, according to an exemplary embodiment of the present disclosure. FIG. 2A is a longitudinal sectional view of the case 10, taken along line I-I in FIG. 1. FIG. 2B is a longitudinal sectional view of the case 10, taken along line I-I in FIG. 1.

Referring to FIGS. 1, 2A and 2B, the case 10 includes a first main wall 12a, a second main wall 12b, a first side wall 12c, a second side wall 12d, a bottom wall 14, and an opening opposite to the bottom wall 14. The first and second main walls 12a and 12b are formed opposite to each other, at a predetermined interval. The first and second main walls 12a and 12b have substantially the same size and shape. The first and second side walls 12c and 12d are formed opposite to each other, at a predetermined interval. The first and second side walls 12c and 12d have substantially the same size and shape. The main walls 12a and 12b have a larger surface area than the side walls 12c and 12d.

Sides of the first and second main walls 12a and 12b are respectively connected to the first side wall 12c, and opposing sides of the first and second main walls 12a and 12b are respectively connected to the second side wall 12d. As such, the case 10 may at least partially define a substantially rectangular box. In one exemplary embodiment, corners formed between the main and side walls may have a rounded or curved. In this case, a cross-section the case 10 taken in the x-y plane may be elliptical, such that the case 10 is tubular.

The bottom wall 14 is connected to ends of the main walls 12a and 12b and the side walls 12c and 12d. In one exemplary embodiment, the bottom wall 14 may be integrally formed with the first and second main walls 12a and 12b and/or the first and second side walls 12c and 12d, using a single piece of material. The case 10 has an opening 16 defined by the main walls 12a and 12b, and the side walls 12c and 12d. The opening 16 opposes the bottom wall 14, with the internal space of the case 10 interposed therebetween.

The thickness of the walls of the case 10 may be in the range of about 0.2 to 1.0 mm. Aluminum or an aluminum alloy may be used as the material of the case 10.

The case 10 has a structure that allows the bottom wall 14 to be opened to the outside of the case 10, under a longitudinal compression environment. The opening of the bottom wall 14 is facilitated by the structure of the bottom wall 14. In particular, the bottom wall 14 may vary in thickness and may include a notch structure.

The bottom wall 14 has a first thickness H1, at edge portions thereof that are disposed adjacent to the two side walls 12c and 12d. The bottom wall 14 has a second thickness H2 at a central portion thereof, disposed between the edge portions. The thickness H1 is greater than the thickness H2. The thickness of the bottom wall may be gradually increased, from the central portion to edge portions.

The difference between the first thickness H1 and the second thickness H2 ranges from about 0.001 mm to 0.5 mm. For example, when the first thickness H1 is 1.0 mm, the second thickness H2 may be 0.5 mm. The difference between the first thickness H1 and the second thickness H2 may be smaller than about 0.001 mm. That is, the difference between the first thickness H1 and the second thickness H2 may be minute.

With regard to the notch structure, the bottom wall 14 may include a main notch 18 (also referred to herein as a first notch) positioned on the inner surface of the bottom wall 14, at the central portion. The main notch 18 extends across the inner surface of the bottom wall 14, between the first and second main walls 12a and 12b. The main notch 18 may be formed on a portion of a line extending across the inner surface of the bottom wall 14, from the first main wall 12a to the second main wall 12b. The main notch 18 may have a V-shaped cross-section. However, the main notch 18 may have various structures and shapes, as long as the thickness (strength) of the bottom wall 14 can be appropriately decreased.

A combination of the shape of the bottom wall 14 and the main notch 18 allow the case 10 is opened to the outside, under a longitudinal compression environment. A longitudinal compression environment refers to an environment similar to a longitudinal compression test, in which the lithium secondary battery 10 is compressed with a force of 13 KN, in both the x-direction and the y-direction (hereinafter, also referred to as both longitudinal directions) for two seconds. In other words, the longitudinal compression environment refers to pressure applied to both side walls of a battery.

As illustrated in FIG. 2B, according to another exemplary embodiment, the case 10 may include a pair of auxiliary notches 19a and 19b positioned on the bottom wall 14, at the boundaries between the bottom wall 14 and the first and second main walls 12a and 12b. The two auxiliary notches 19a and 19b are also referred to as second notches. The second notch, positioned between the first main wall 12a and a boundary surface of the bottom wall 14, may be referred to as a 2A-th notch, and the second notch positioned between the second main wall 12b and a boundary surface of the bottom wall 14, may be referred to as a 2B-th notch.

When the case 10 includes the auxiliary notches 19a and 19b and the main notch 18, the bottom wall 14 is bent outward, under a longitudinal compression environment. The structure and shape of the auxiliary notches 19a and 19b may be substantially the same as the main notch 18.

Figure 3:
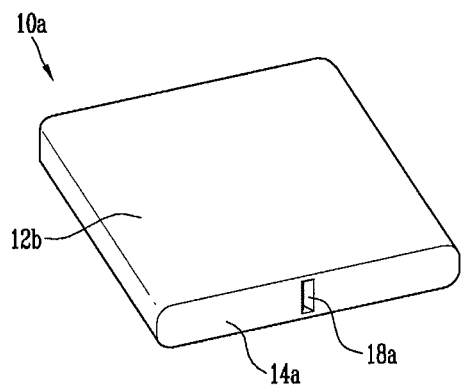
FIG. 3 is a perspective view of a case for secondary battery according to another embodiment of the present disclosure.
Figure 4:
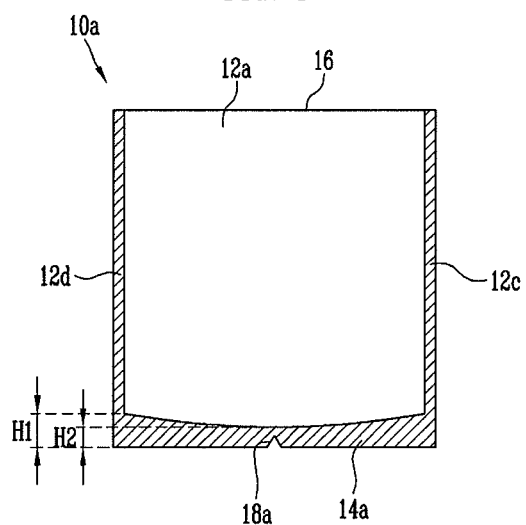
FIG. 4 is a longitudinal sectional view of the case for secondary battery in FIG. 3.

FIG. 3 is a perspective view of a case 10a for secondary battery, according to another exemplary embodiment of the present disclosure. FIG. 4 is a longitudinal sectional view of the case 10a. Referring to FIGS. 3 and 4, the case 10a has a bottom wall 14a that includes a notch structure, so that a bottom wall 14a is opened to the outside of the case 10a, under a longitudinal compression environment.

The first thickness H1 of edge portions of the bottom wall 14a, adjacent to two side walls 12c and 12d, is thicker than the second thickness H2 of a central portion of the bottom wall 14a, positioned between the edge portions. That is, the thickness of the bottom wall 14a may be gradually increased, from the central portion to the side walls 12c and 12d.

The bottom wall 14a includes a main notch 18a. The main notch 18a is formed at the central portion, in the outer surface of the bottom wall 14a and extends between the first and second main walls 12a and 12b. The bottom wall 14a may have auxiliary notches like those illustrated in FIG. 2B. The case 10a may be substantially identical to the case 10, except that the main notch 18a is formed in the outer surface of the bottom wall 14a.

Figure 5:
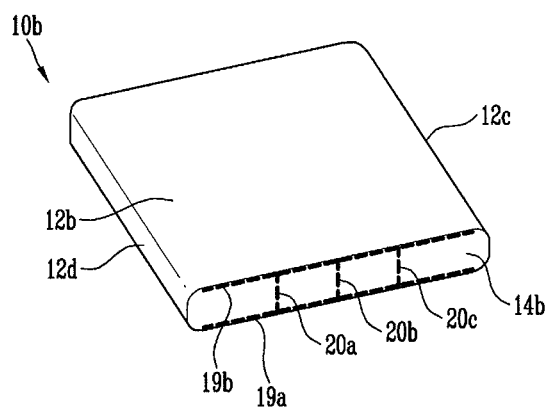
FIG. 5 is a perspective view of a case for secondary battery according to still another embodiment of the present disclosure.
Figure 6:
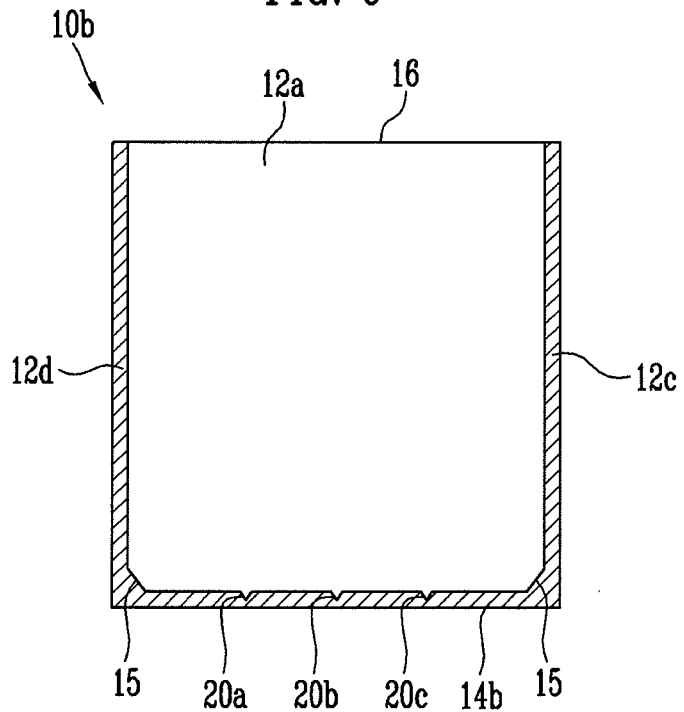
FIG. 6 is a longitudinal sectional view of the case for secondary battery in FIG. 5.

FIG. 5 is a perspective view of a case 10b for a secondary battery, according to still another exemplary embodiment of the present disclosure. For convenience of illustration, a notch structure formed on an inner surface of a bottom wall 14b is shown as a dotted line on the outside of the bottom wall 14b, in FIG. 5. FIG. 6 is a longitudinal sectional view of the case 10b. Referring to FIGS. 5 and 6, the bottom wall 14b is designed to be opened to the outside of the case 10b under, a longitudinal compression environment.

In the bottom wall 14b, the first thickness H1 of edge portions of the bottom wall 14b, adjacent to two side walls 12c and 12d, is thicker than the second thickness H2 of the central portion of the bottom wall 14b, positioned between the edge portions of the bottom wall 14b. Particularly, the bottom wall 14b has inclined portions 15 formed adjacent to the side walls 12c and 12d. The inclined portions 15 increase the thickness of the boundary between the side walls 12c and 12d and the bottom wall 14b. Thus, the inclined portions 15 facilitate outward deformation of the bottom wall 14d, under a longitudinal compression environment, until the bottom wall 14d is ruptured by the compression.

The bottom wall 14b may have a consistent thickness, between the two inclined portions 15. The bottom wall 14b includes first, second, and third main notches. The thickness of the bottom wall 14b, between the inclined portions 15, may remain constant, except for in areas including the main notches 20a, 20b, and 20c. The second main notch 20b is positioned on the central portion of the bottom wall 14b between the side walls 12c and 12d. The first main notch 20a is positioned on the bottom wall 14b, between the side wall 12d and the second main notch 20b. The third main notch 20c is positioned on the bottom wall 14b, between the side wall 12c and the second main notch 20b. The main notches 20a, 20b, and 20c are formed in the inner surface of the bottom wall 14b and extend between first and second main walls 12a and 12b. According to some aspects the main notches 20a, 20b, and 20c may extend to contact the main walls 12a and 12b, i.e., may be shorter than the width of the bottom wall 14b, or may extend all the way to the main walls 12a and 12b.

The notch structure may have at least one of the auxiliary notches illustrated in FIG. 2B. The case 10b is substantially identical to the case 10, except the bottom wall 14b is generally flat, except for the inclined portions 15 and the main notches 20a, 20b, and 20c, on the inner surface of the bottom wall 14b. The three main notches 20a, 20b and 20c may be referred to as 1A-th, 1B-th, and 1C-th notches, respectively.

Figure 7:
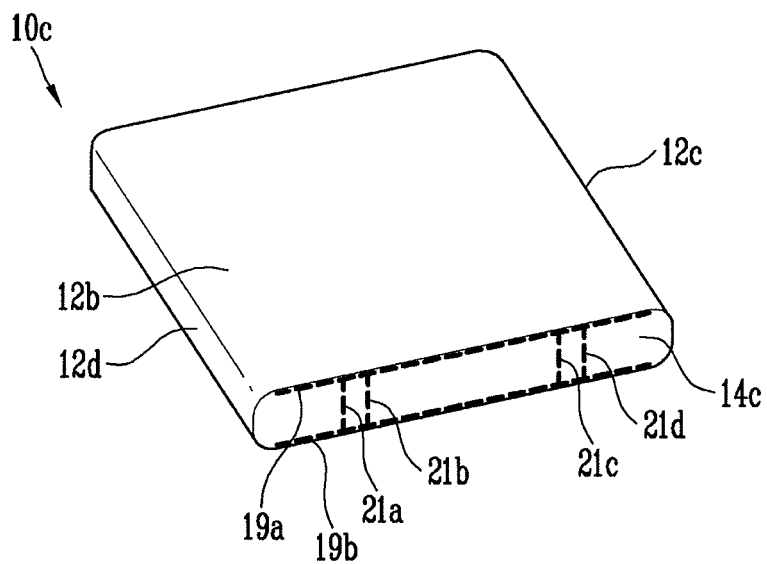
FIG. 7 is a perspective view of a case for secondary battery according to still another embodiment of the present disclosure.
Figure 8:
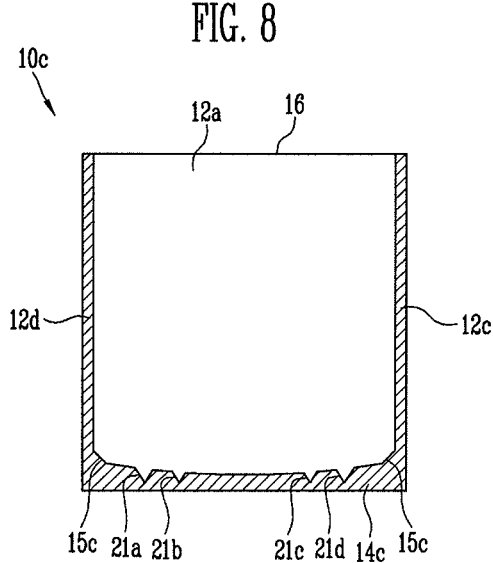
FIG. 8 is a longitudinal sectional view of the case for secondary battery in FIG. 7.

FIG. 7 is a perspective view of a case 10c for secondary battery, according to still another exemplary embodiment of the present disclosure. For convenience of illustration, a notch structure formed at an inner surface of a bottom wall 14c is shown as a dotted line projected on an outer surface of the bottom wall 14c, in FIG. 7. FIG. 8 is a longitudinal sectional view of the case 10c.

Referring to FIGS. 7 and 8, the case 10c has a bottom wall structure and a notch structure, so that a bottom wall 14c is opened to the outside of the case 10c, under a longitudinal compression environment. In particular, the bottom wall 14c is thicker adjacent to side walls 12c and 12d than in a central portion thereof.

The bottom wall 14c includes inclined portions 15c adjacent to the side walls 12c and 12d. The inclined portions 15c increase the thickness of the boundaries between the side walls 12c and 12d and the bottom wall 14c. Thus, the inclined portions 15c facilitate an outward expansion of the bottom wall 14c, under a longitudinal compression environment. The thickness of the bottom wall 14c, between the two inclined portions 15c, may be decreased from the outside portions of the bottom wall 14c to the inside portion of the bottom wall 14c.

The bottom wall 14c includes a notch structure. In particular, the bottom wall 14c includes a pair of fourth main notches 21a and 21b and a pair of fifth main notches 21c and 21d on the inner surface thereof. The fourth main notches 21a and 21b are positioned on the bottom wall 14c adjacent to the second side wall 12d, between the first and second side walls 12c and 12d. The fifth main notches 21c and 21d are positioned adjacent to the first side wall 12c, the first and second side walls 12c and 12d. The pairs of main notches 21a, 21b, 21c, and 21d extend between first and second main walls 12a and 12b.

The bottom wall 14c may further include at least one of the auxiliary notches illustrated in FIG. 2B. Although the four main notches 21a, 21b, 21c, and 21d are described, other numbers of notches may be employed. In addition, the same operational effect can be substantially obtained, if fewer main notches are combined with auxiliary notches. That is, the fourth or fifth main notches may each include at least one notch. The fourth and fifth main notches may be referred to as 1D-th and 1E-th notches, respectively.

Figure 9A:
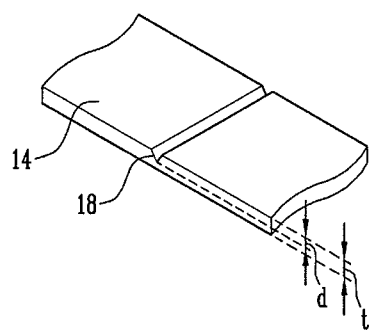
FIGS. 9A to 9D are partial perspective views illustrating notch structures applicable to the case for secondary battery according to embodiments of the present disclosure.

FIGS. 9A to 9D are partial perspective views illustrating notches having modified structures, which are applicable to the any of the previously described notches. Referring to FIG. 9A, a notch 18 formed in a bottom wall 14 of a case may have a V-shaped, widthwise, cross-section.

When the thickness t of the bottom wall 14 is about 0.2 to 1.0 mm, the depth d of the notch 18 may be formed to have about 30 to 50% of the thickness t of the bottom wall 14. If the depth d of the notch 18 is too deep, the case may have reduced durability. If the depth d of the notch 18 is too shallow, the bottom wall 14 may not open under a desired pressure.

Figure 9B:
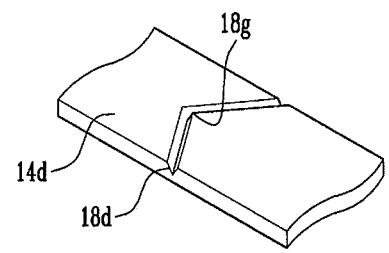

Referring to FIG. 9B, a bottom wall 14d of a case, according to another exemplary embodiment may have a notch 18d that is V-shaped. In other aspects the notch 18d may be zigzag shaped such that it includes one or more bent portions 18g.

Figure 9C:
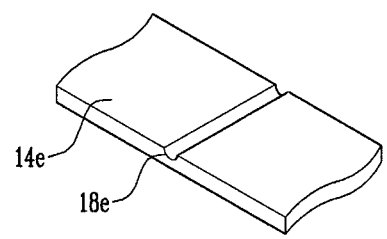

Referring to FIG. 9C, a bottom wall 14e of a case, according to still another exemplary embodiment, may have a notch 18e that has a semi-circular, widthwise, cross-section. Here, The notch 18e basically corresponds to a main notch.

Figure 9D:
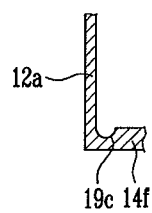

Referring to FIG. 9D, a bottom wall 14f of a case, according to still another exemplary embodiment may have an auxiliary notch 19c with a semi-circular, widthwise, cross-section. The notch 19c is formed on the bottom wall 14f, at the boundary between the first main wall 12a and the bottom wall 14f.

Figure 10:
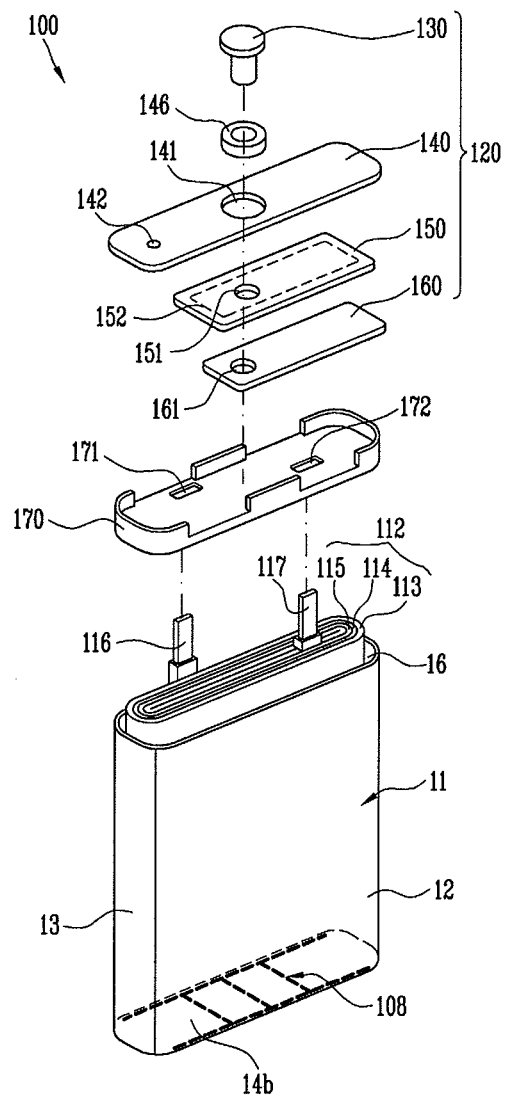
FIG. 10 is an exploded perspective view of a lithium secondary battery using the case of FIG. 4.

FIG. 10 is an exploded perspective view of a lithium secondary battery 100, including the case of FIG. 4. Referring to FIG. 10, the lithium secondary battery 100 a case 11, an electrode assembly 112 accommodated in the case 11, and a cap assembly 120 sealing a top opening 16 of the case 11. Here, the case 11 has a bottom wall 14b including a notch structure 108, which are designed so that a bottom wall 14b is opened externally, under a longitudinal compression environment, i.e., an increase in the internal pressure of the lithium secondary battery 100.

The case 11 includes two opposing main walls 12; two opposing side walls 13 connecting the main walls 12; the bottom wall 14b, which is connected to ends of the main walls 12 and the side wall 13; and an opening 16 opposite to the bottom wall 14b.

The case 11 is substantially identical to the case 10b illustrated in FIG. 5. However, any of the cases described herein and/or the modifications thereto may be applied to the battery 100.

The electrode assembly 112 includes a first electrode plate 113, the second electrode plate 115, and a separator 114. The first and second electrode plates 113 and 115 may be positive and negative electrode plates respectively, or vice versa. The first and second electrode plates 113 and 115 may be stacked with the separator 114 interposed therebetween and then wound in a jellyroll form. A first electrode tab 116 is welded to the first electrode plate 113, and a second electrode tab 117 is welded to the second electrode plate 115. End portions of the first and second electrode tabs 116 and 117 protrude toward the cap assembly 120.

The cap assembly 120 includes a cap plate 140, an insulating plate 150, a terminal plate 160, and an electrode terminal 130. The cap assembly 120 is connected to the top opening 16 of the case 11 with a separate insulating body 170 interposed therebetween, so as to seal the case 11.

The cap plate 140 is formed as a metal plate having a size and shape corresponding to the top opening 16 of the case 11. Light-weight aluminum or a light-weight aluminum alloy may be used as the material of the cap plate 140. A first terminal through-hole 141 is formed in the center of the cap plate 140. An electrolyte injection hole 142 is formed at one side of the cap plate 140.

The first terminal through-hole 141 is formed in the cap plate 140 and has a larger diameter than that of the electrode terminal 130. The electrode terminal 130 is inserted into the first terminal through-hole 141, with a tubular gasket 146 interposed therebetween. The gasket 146 insulates the electrode terminal 130 from the cap plate 140.

After the cap assembly 120 is connected to the opening 16 of the case 11, an electrolyte is injected into the case 11, through the electrolyte injection hole 142. The electrolyte injection hole 142 is sealed by a separate sealing member. The electrolyte may be a solid polymer containing lithium salt or a liquid polymer in which the lithium salt is dissociated in an organic solvent.

The insulating plate 150 insulates the cap plate 140 from the terminal plate 160. An insertion groove 152 is provided in a lower surface of the insulating plate 150. The insertion groove 152 has a size corresponding to that of the terminal plate 160, so that the terminal plate 160 can be inserted therein. The insulating plate 150 is provided with a second terminal through-hole 151, formed at a position corresponding to the first terminal through-hole 141. The second terminal through-hole 151 is formed to have a diameter almost identical to that of the electrode terminal 130.

The terminal plate 160 may be formed with nickel or nickel alloy. The terminal plate 160 is provided with a third terminal through-hole 161 formed at a position corresponding to the second terminal through-hole 151 of the insulating plate 150. The electrode terminal 130 passes through the second terminal through-hole 151, is inserted into the third terminal through-hole 161, and is connected to the insulating body 170.

The insulating body 170 is provided with a first electrode tab hole 171 and a second electrode tab hole 172. The first electrode tab 116 is connected to the cap plate 140, by passing through the first electrode tab hole 171. The second electrode tab 117 is connected to the electrode terminal 130, by passing through the second electrode tab hole 172. The insulating body 170 is connected to the lower portion of the cap assembly 120, and thus, allows the cap assembly 120 to be electrically isolated from the electrode assembly 112.

In the lithium secondary battery 100, the bottom wall 14b can be opened to the outside, due to the structure of the bottom wall 14b, under a longitudinal compression environment. Thus, the lithium secondary battery 100 can prevent, in some circumstances, the electrode assembly 12 from being pierced by the bottom wall 14b, under a longitudinal compression environment. Accordingly, it is possible to prevent the lithium secondary battery from exploding.

Figure 11A:
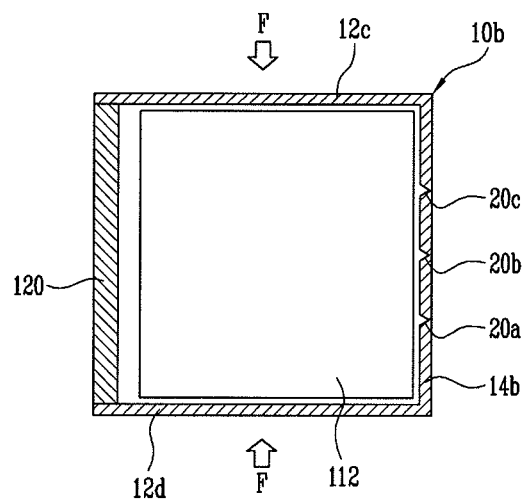
FIGS. 11A and 11B are schematic sectional view illustrating longitudinal compression characteristics of the lithium secondary battery of FIG. 10.
Figure 11B:
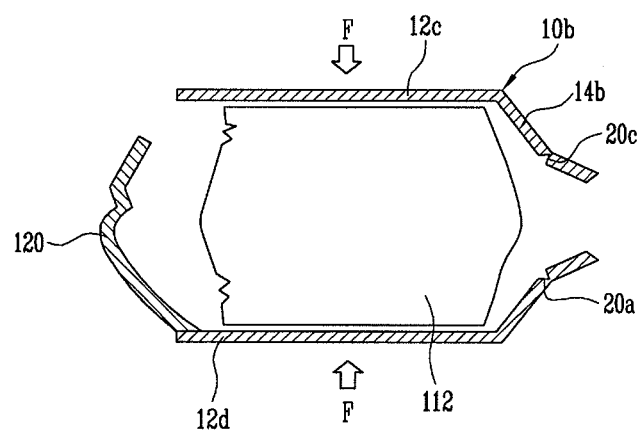

FIGS. 11A and 11B are schematic sectional view illustrating longitudinal compression characteristics of the lithium secondary battery 110 of FIG. 10, before and after a force F of 13 KN is applied in both width directions, for two seconds. After the force is applied, the bottom wall 14b of the case 10b is opened to the outside thereof. Thus, it is possible to prevent the electrode assembly 112 from being pierced by the bottom wall 14b.

In a comparative lithium secondary using a case having a conventional bottom wall, when the case is collapsed during a longitudinal compression test, the bottom wall is folded to the inside and outside of the case. In this case, portions of the folded bottom wall pierce the electrode assembly of the battery. Therefore, in the comparative example, the longitudinal compression test results in an explosion.

However, in a lithium secondary according to the present disclosure, when a compressive load is applied, a bottom wall of a case is opened to the outside thereof, so that it is possible to prevent an electrode assembly from being pierced by the bottom wall. Accordingly, it is possible to prevent the lithium secondary battery from easily proceeding to an explosion mode.

Although a few exemplary embodiments of the present disclosure have been shown and described, it would be appreciated by those skilled in the art that changes may be made in these exemplary embodiments, without departing from the principles and spirit of the disclosure, the scope of which is defined in the claims and their equivalents.

What is claimed is:

1. A case of a secondary battery, comprising:
   opposing first and second main walls;
   opposing first and second side walls extending between the main walls, and having a smaller surface area than the main walls; and
   a bottom wall connected to ends of the main walls and the side walls, the bottom wall having:
      an inner surface facing an opening of the case and an opposing outer surface;
      edge portions connected to the side walls;
      a central portion disposed between the edge portions, having a thickness that is less than the thicknesses of the edge portions; and
      a first notch disposed in the central portion, extending from the first main wall to the second main wall wherein the first notch is dimensioned and positioned in the central portion so that the bottom wall opens to the outside under a longitudinal compression environment and wherein the thickness of the bottom wall gradually decreases from the side walls to a point in the central portion that is equidistant to the side walls.

2. The case according to claim 1, wherein the first notch is formed on the outer surface of the bottom wall.

3. The case according to claim 1, wherein the bottom wall has a plurality of the first notches, disposed at a regular interval between the side walls, in the central portion.

4. The case according to claim 1, wherein the bottom wall has a plurality of the first notches, disposed in pairs, in the central portion,
   wherein the first notches of each pair are disposed closer to one another than to other ones of the first notches.

5. The case according to claim 1, wherein the bottom wall has second notches that extend along interfaces of the main walls and the bottom wall.

6. The case according to claim 4, wherein the bottom wall has second notches that extend along interfaces of the main walls and the bottom wall.

7. The case according to claim 6, wherein the second notches are connected to the first notches.

8. The case according to claim 7, wherein the depth of the first and second notches is about 30% to 50% of the thickness of the bottom wall.

9. The case according to claim 1, wherein external corners between the main walls and the side walls are rounded.

10. The case according to claim 1, wherein the case is formed of aluminum or an aluminum alloy.

11. A lithium secondary battery comprising:
the case of claim 1;
an electrode assembly disposed in the case; and
a cap assembly sealing the open end of the case.

12. The case according to claim 1, wherein:
the bottom wall has a plurality of the first notches disposed on the inner surface of the bottom wall; and
inner surfaces of the edge portions are inclined with respect to the inner surface of the central portion.

13. The case according to claim 1, wherein the first notch is semicircular or V-shaped in widthwise cross-section.

14. The case according to claim 1, wherein the first notch extends between the main walls in a V-shaped pattern or a zigzag pattern.

15. A case of a secondary battery, comprising:
first and second opposing main walls;
first and second opposing side walls extending between the main walls, having a smaller surface area than the main walls; and
a bottom wall connected to ends of the main walls and the side walls, the bottom wall having:
a generally flat central portion;
edge portions disposed between the central portion and the side walls, having thicknesses that increase from the central portion to the corresponding sidewalls; and
a first notch formed in the inner surface of the bottom wall, in the central portion, and extending generally parallel to the side walls wherein the first notch is dimensioned and positioned in the inner surface of the bottom wall so that the bottom wall opens to the outside in a longitudinal compression environment and wherein the thickness of the bottom wall gradually decreases from the side walls to a point in the central portion that is equidistant to the side walls.

16. The case according to claim 15, wherein the bottom wall has second notches extending along interfaces of the main walls and the bottom wall.

17. The case according to claim 15, wherein the second notches are directly connected to the first notch.

18. The case according to claim 15, wherein the bottom wall comprises a plurality of the first notches disposed equidistantly from one another, in the central portion.

19. The case according to claim 15, wherein the bottom wall has a plurality of the first notches, disposed in pairs in the central portion,
wherein the first notches of each pair are disposed closer to one another than to other ones of the first notches.

20. A case of a secondary battery, comprising:
first and second opposing main walls;
first and second opposing side walls extending between the main walls, and having a smaller surface area than the main walls; and
a bottom wall connected to ends of the main walls and the side walls, the bottom wall having:
a first notch formed in a surface of the outer wall, extending generally parallel to the side walls wherein the first notch is dimensioned and positioned in the inner surface of the outer wall so that the outer wall opens to the outside in a longitudinal compression environment and wherein the thickness of the bottom wall gradually decreases from the side walls to a point in the central portion that is equidistant to the side walls; and
second notches that extend along interfaces of the main walls and the bottom wall,
wherein the thickness of the bottom wall increases as a distance to a closest one of the side walls decreases.

* * * * *